United States Patent

Mueller et al.

[11] Patent Number: 6,067,289
[45] Date of Patent: May 23, 2000

[54] PROCESS FOR TRANSMITTING DATA IN A COMMUNICATION NET

[75] Inventors: Joerg-Martin Mueller, Schwaikheim; Bertram Waechter, Allmersbach/Tal, both of Germany

[73] Assignee: Robert Bosch GmbH, Stuttgart, Germany

[21] Appl. No.: 08/945,838

[22] PCT Filed: Apr. 24, 1996

[86] PCT No.: PCT/DE96/00713

§ 371 Date: Jan. 12, 1998

§ 102(e) Date: Jan. 12, 1998

[87] PCT Pub. No.: WO96/35299

PCT Pub. Date: Nov. 7, 1996

[30] Foreign Application Priority Data

May 5, 1995 [DE] Germany .......................... 195 16 078

[51] Int. Cl.$^7$ .............................. H04B 7/00; H04B 1/38
[52] U.S. Cl. ........................................... 370/310; 375/220
[58] Field of Search .................................. 370/470, 472, 370/474, 477, 310, 345, 465, 466, 336, 338; 375/200, 222, 265

[56] References Cited

U.S. PATENT DOCUMENTS 4,924,480  5/1990  Gay et al. ............................. 375/222
5,497,396  3/1996  Delprat ................................. 375/220
5,953,666  9/1999  Lehtimaki ............................. 370/345
5,991,716  11/1999  Lehtimaki ............................. 704/212

OTHER PUBLICATIONS

Masami Yabusaki et al., Voice Communication Connection Control in Digital Public Land Mobile Networks, IEICE Transactions on Fundamentals of Electronics, Communications and Computer Sciences, p. 1702–1709, Dec. 1992.

Satoh et al., TDMA Half–Rate Digital Cellular System Based on PDC Standard in Japan; Proceedings of The Vehicular Technology Conference; p. 301–305, Jul. 1995.

*Primary Examiner*—Chi H. Pham
*Assistant Examiner*—Maikhanh Tran
*Attorney, Agent, or Firm*—Kenyon & Kenyon

[57] ABSTRACT

For transmitting GSM data in a communication network (PSTN), a predefined frame format (TRAU) is preserved in the communication network (PSTN) for mobile stations (TL1, TL2). This predefined frame format (TRAU) is preserved even if the coding rates in the uplink and downlink are different. Recoding, in particular, takes place only in the downlink with the advantage that the uplink and downlink are completely isolated from one another regarding the coding rates used or a discontinuous/continuous (DTX) operation.

8 Claims, 4 Drawing Sheets

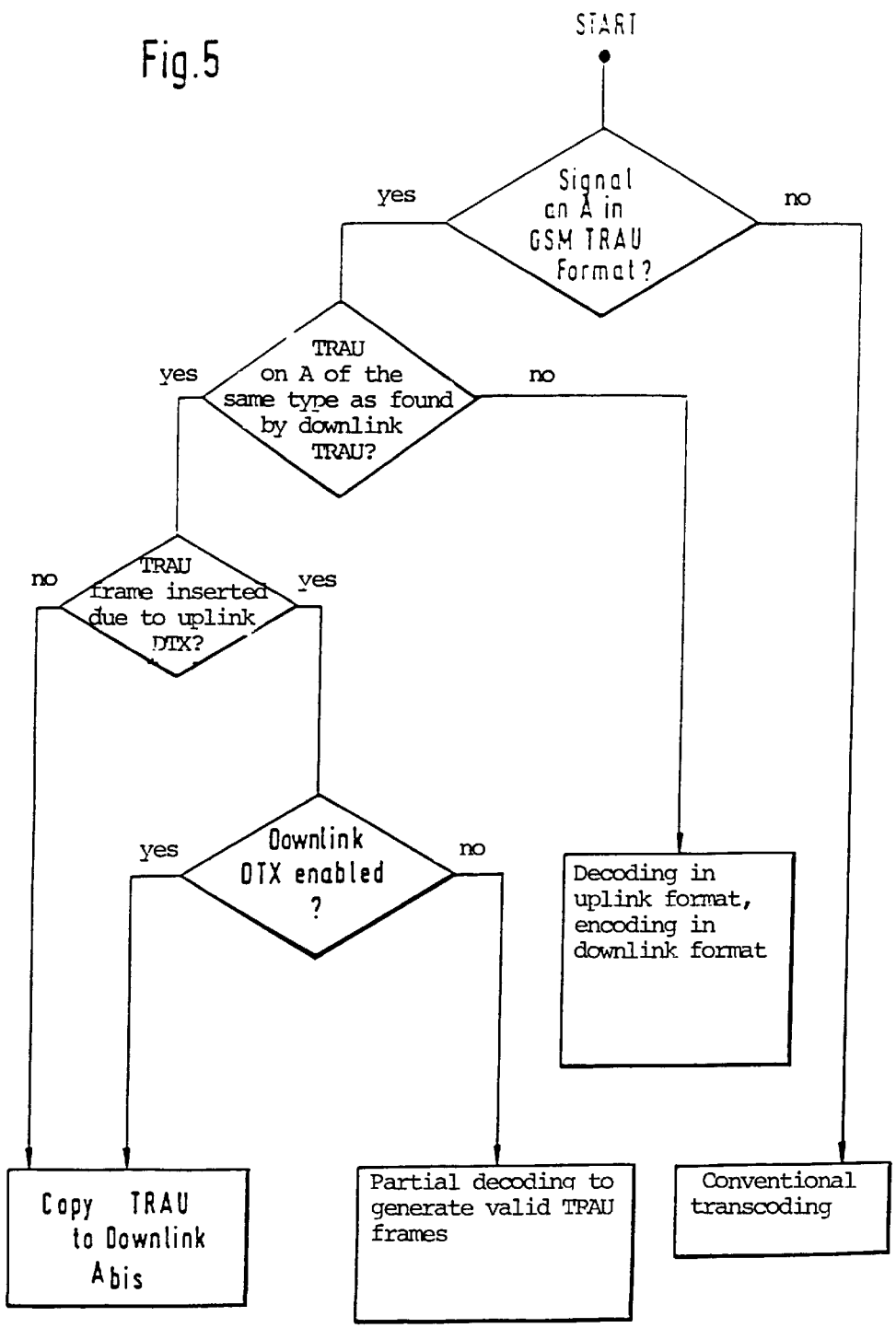

PROCESS FOR TRANSMITTING DATA IN A COMMUNICATION NET

FIELD OF THE INVENTION

The present invention relates to a method for transmitting GSM data between at least two stations over a communication network.

BACKGROUND INFORMATION

In previous GSM data connections, in particular for digitized voice data between mobile stations over a communication network such as the public telephone network (PSTN—Public Switched Telephone Network), the GSM data in GSM format are converted into the frame format of the communication network—64 kbit/s PCM for PSTN—using a transcoder. For DMCS 900 mobile radio systems, such transcoding is performed at the base stations, or the A interface with the PSTN communication network. Pursuant to GSM recommendation 0860/0861, digital voice transmission takes place in "TRAU (Transcode and Rate Adaptor Unit) frames," i.e., in 16 kbit/s format transmission frames at FR (Full Rate) transmission and 8 kbit/s or 16 kbit/s at HR (Half Rate) transmission.

SUMMARY OF THE INVENTION

European Patent No. 0 332 345 describes a recoding device between two stations of a telephone network, wherein it is verified whether the data transmitted by a transmitting station is present in a predefined frame format. If the predefined frame format is recognized, the data to be transmitted is switched through transparently in accordance with the coding rates. If the code rates are different, the data is recoded to the other code rate.

European Patent No. 0 605 311 describes transcoding devices arranged between stations and a communication network and serve for matching the format used by the station to that of the communication network. This transcoding device is always in the proximity of each station using a first transmission format. The transcoding devices are activated only if the format used by the station does not correspond to that used by the network.

An object of the present invention is to provide a method for transmitting data wherein the degradation of the voice quality due to transcoding is avoided, and which can be implemented without increasing the complexity of existing transcoding devices. The voice quality in the GSM network, particularly D1 networks, is improved when voice is transmitted from a mobile station to another mobile station. In addition, a uniform format (predefined TRAU frame format) is used for transmission in the communication network—PSTN network—regardless of whether the data/voice was transmitted at different coding rates—full rate and/or half rate. The uniform format offers the advantage that the "uplink" (transmitter direction) is completely separated from the "downlink" (receiver direction). Even discontinuous transmission operation (DTX) is possible without difficulty. No problems occur in the case of handover between mobile stations during communication.

BRIEF DESCRIPTION OF THE DRAWINGS

FIG. 5 illustrates a flow chart of the method according to the present invention.

DETAILED DESCRIPTION OF THE INVENTION

Figure 1:
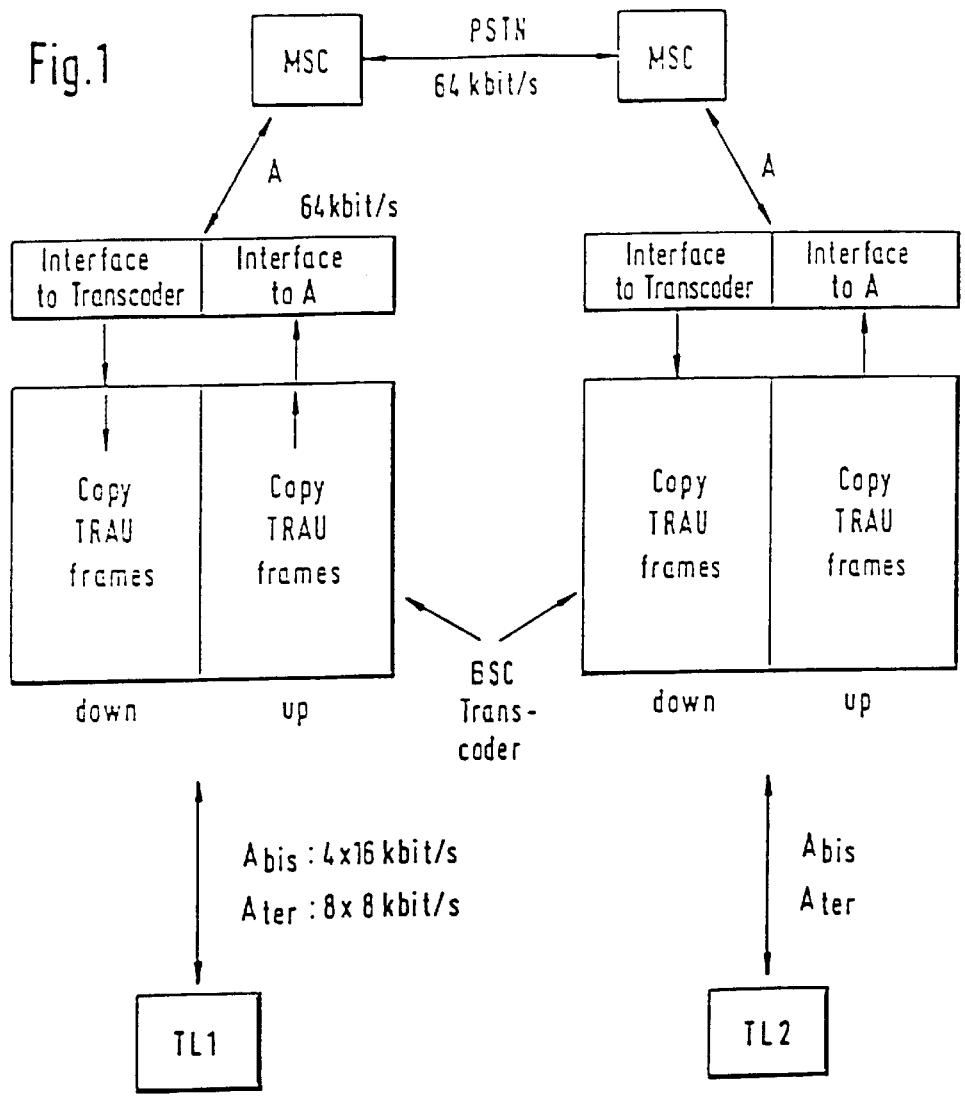
FIG. 1 illustrates transcoder-free transmission with the same compression scheme for uplink and downlink.
Figure 2:
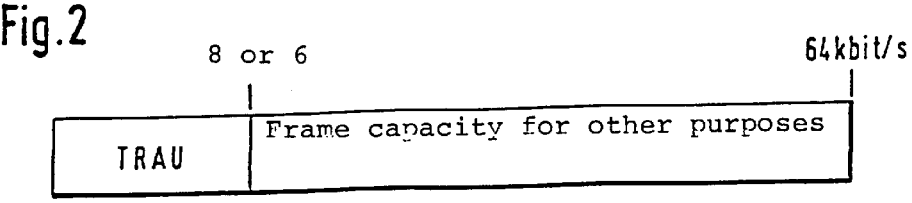
FIG. 2 illustrates the frame format for transmission in the communication network.

In the existing GSM network (fixed network side), for example, the DMCS 900 network, transcoding continuously takes place, i.e., voice data is recoded from the given TRAU (Transcode and Rate Adaptor Unit) format into the transmission format of the communication network, for example, the public telephone network PSTN. While the given TRAU frame format uses a 16 kbit/s transmission rate when voice data is transmitted in the FR (Full Rate) mode, the transmission rate in the PSTN network is 64 kbit/s. At HR (Half-Rate mode), the transmission rate is 8 kbit/s or 16 kbit/s. Other transmission rates of the form 1/n are also possible, where n is a natural number. FIG. 1 shows the transmission scheme between mobile stations Tl1 and Tl2 for transmission and receiving operations, with the same compression scheme being used for the uplink and downlink. The voice data is transmitted by a mobile station, e.g. Tl1, to a base station. This base station has a transcoder device—BSC transcoder—with input interface $A_{bis}/A_{ter}$ in the direction of station Tl1. $A_{bis}$ the configuration for the FR mode: 4×16 kbit/s. $A_{ter}$ provides the configuration for the HR mode: 8×8 kbit/s. The interface for the Mobile Services Switching Center MSC is denoted as A. The voice data are already present at the A interface in the 64 kbit/s frame format. The voice data is transmitted from one MSC to another MSC via the PSTN network with a 64 kbit/s frame format. FIG. 2 shows the frame format for 64 kbit/s and the linking of a TRAU frame with 8 or 16 kbit/s depending on the coding rate/compression. In the following it will be assumed that for establishing communication between mobile stations Tl1 and Tl2, it is signaled whether or not transcoder-free operation is possible. For this purpose, it is verified whether the voice data to be transmitted by the transmitting station Tl1 is present in the predefined TRAU frame format. If the predefined frame format is recognized, the voice data to be transmitted is switched through transparently, preserving the predefined frame format; i.e., the TRAU frames received at the $A_{bis}$ interface are copied to the 64 kbit/s A interface, i.e., inserted unchanged into the PSTN frame format (FIG. 1: Copy TRAU frames). Since FR TRAU frames only need 16 kbit/s, and HR TRAU frames need 8 kbit/s, for example, sufficient frame capacity remains for other purposes, e.g., for transmitting signaling information and/or transmission of additional data over the same transmission path within the PSTN network. For example, voice data of a plurality of different transmission channels can be multiplexed in the PSTN frames. In the embodiment of FIG. 1, uplink and downlink have the same compression scheme (HR or FR). In this case, the voice data transmitted by Tl1 can also be copied from the A interface to the $A_{bis}$ or $A_{ter}$ interface with a BSC transcoder.

Figure 3:
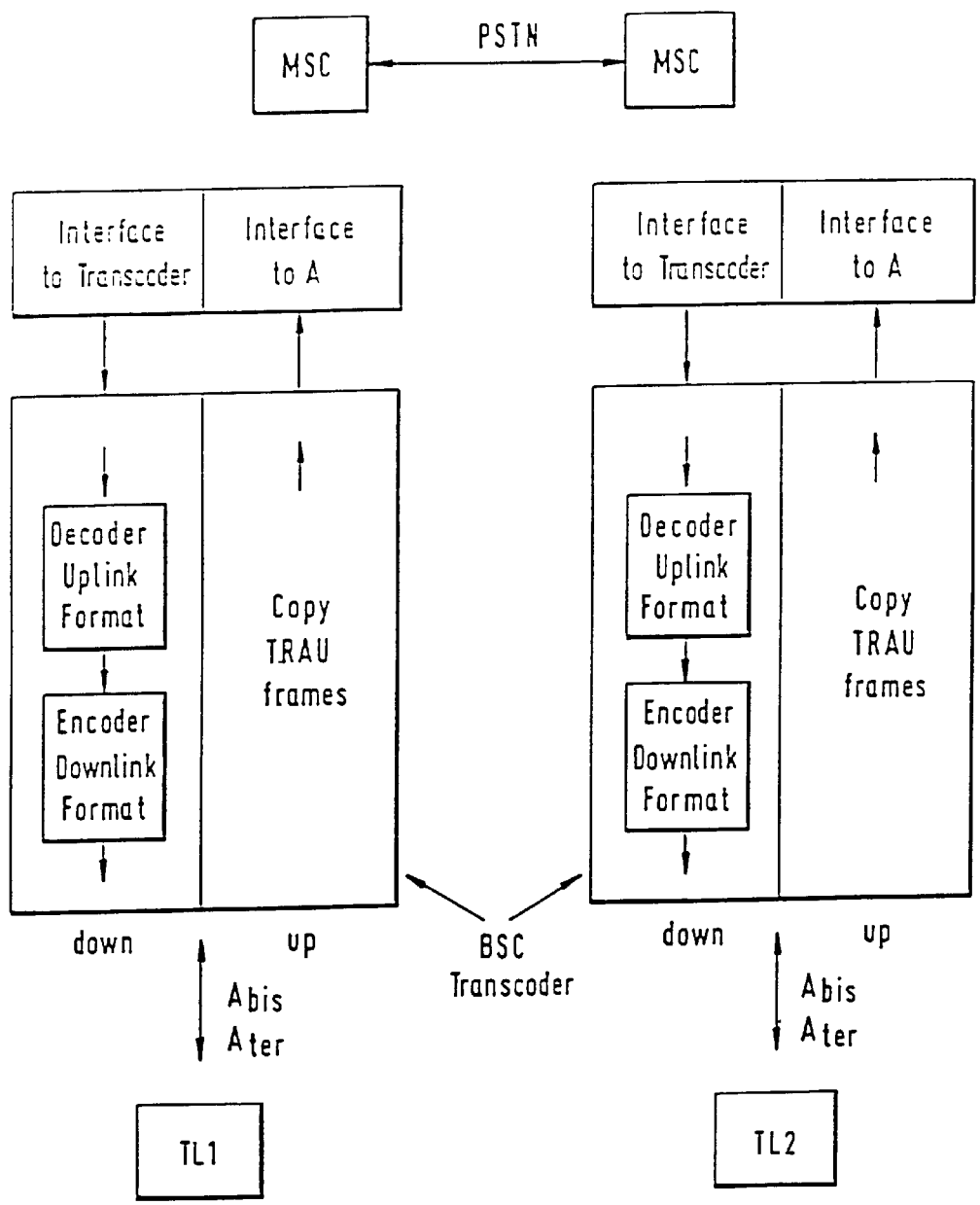
FIG. 3 illustrates a transcoder-free transmission with different compression schemes for uplink and downlink.

If the uplink and downlink have different compression schemes/coding rates, recoding is required. There are two recoding options available, one of which is illustrated in FIG. 3. The first option consists of decoding the data in the uplink (with the uplink compression scheme), transmitting a PCM signal and encoding it in the downlink (with the downlink compression scheme). This process has two important disadvantages: first, the transmission process in the PSTN network is constantly switched between the TRAU format and PCM transmission; second, signaling is required, since the uplink transcoder must be at all times aware of whether the downlink is operating by the same transmission process. This is particularly critical due to the fact that handover to another compression scheme may take place at any time. According to the invention, the TRAU frame format is preserved for the transmission even in the case of different coding rates in the uplink and downlink. Both decoding with the uplink compression scheme and encoding with the downlink compression scheme preferably take place only in the downlink, i.e., on the segment between the PSTN communication network and the receiving station Tl2. In the embodiment of FIG. 3, both the decoder and encoder are in the downlink path of the BSC transcoder. For the uplink, the TRAU frames can be copied from the $A_{bis}$ or $A_{ter}$ interface to the A interface. The advantage of this principle consists of the fact that the uplink and downlink are completely isolated from one another. The downlink transcoder must only identify the TRAU frame format received via the A interface and compare it with the format used in its downlink. If the frame formats are identical, the transcoder operates in a transparent mode, i.e., switching-through takes place without modification; otherwise recoding is performed, i.e., encoding in the format of the uplink/decoding in the format of the downlink.

If not all the transcoders present in the GSM network can be equipped with the resources according to the invention, handover to a transcoding device that does not support transcoder-free switching-through/coding rate change must be ensured. One possible method for doing so is presented below: A conventional transcoder, which does not support transcoder-free transmission from a mobile station to another mobile station (MMC=Mobile to Mobile Communication), interprets the TRAU frames as valid frames for voice data, which is extremely disadvantageous from the point of view of the subjective voice quality, and transmits a PCM signal, which has nothing in common with the regular structure of a TRAU frame. A transcoder, designed according to the invention, which supports transcoder-free MMC transmission, has an analyzer, which can detect whether a PCM signal or a TRAU frame has been sent. If a PCM signal is detected, for example, from a fixed station, the transcoder switches to PCM transmission (FIG. 5).

In the case of discontinuous transmission (DTX), voice data frames are only transmitted occasionally, for example, two to four times per second. The missing voice data frames are inserted in the decoder of the transcoder device. Simple repetition of the missing frames results in poor voice quality. The missing voice parameters must be determined by an interpolation process, which requires partial signal decoding. The same is true for error correction processes in the case of uncorrected transmission errors or illegal information bits detected.

In DTX transmission, the following cases may occur:

DTX enabled in the uplink and downlink,

DTX disabled in the uplink and downlink,

DTX disabled in the uplink and enabled in the downlink,

DTX enabled in the uplink and disabled in the downlink.

Figure 4:
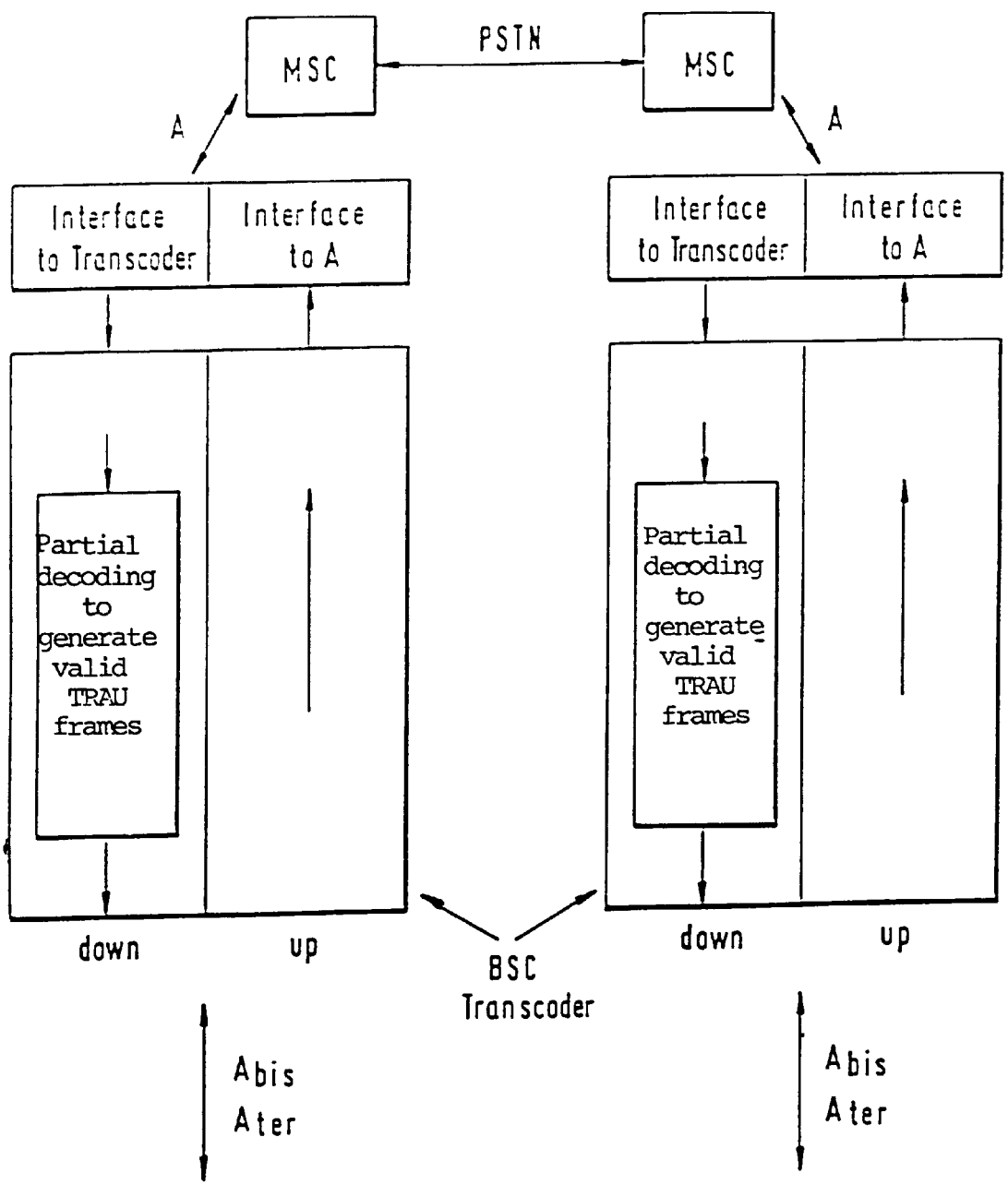
FIG. 4 illustrates a transcoder-free transmission with DTX operation.

The first three configurations result in no problems regarding the transmission process explained above with reference to FIGS. 1 and 3. When DTX is enabled in the uplink, the uplink transcoder inserts the missing TRAU frame and marks it as inserted. If DTX is also enabled in the downlink, the TRAU frames inserted are suppressed in the downlink DTX handler. In the last configuration, valid voice data frames must be generated (FIG. 4), since no DTX transmission is provided in the downlink. If the compression schemes are different, recoding is performed as described above. If, however, the same compression scheme is used, parallel decoding must be performed (FIG. 4) in the decoder of the downlink transcoder in order to generate valid TRAU frames.

FIG. 5 shows all the process steps described above as a flow chart, which can be run, for example, in the interface to the transcoder.

We claim:

1. A method for transmitting GSM data between at least two stations over a communication network, the method comprising the steps of:

checking whether the data to be transmitted from a transmitting station are present in a predefined frame format;

if the data is in the predefined frame format, performing the following:

checking whether a coding rate of the transmitting station is identical to a coding rate of a receiving station;

switching the data through transparently and preserving the predefined frame format if the coding rate of the transmitting station is identical to the coding rate of the receiving station;

recoding the data to another coding rate and preserving the predefined frame format if the coding rate of the transmitting station and the coding rate of the receiving station are different;

wherein, when the coding rate of the transmitting station and the coding rate of the receiving station are different, decoding is first performed for a compression used on a transmitting side and then encoding is performed for a compression used on a receiving side; and wherein recoding is performed only on a segment between the communication network and the receiving station.

2. The method according to claim 1, wherein switching the data through transparently includes the step of inserting predefined frame format data into the predefined frame format of the communication network without changing the data.

3. The method according to claim 1, wherein the predefined frame format includes the steps of:

using a first frame for a 16 kbit/s transmission rate and using a second 64 kbit/s frame for the communication network, if a compression factor is equal to 1; and selecting only one value 1/n in relation to a transmission rate, if the compression factor is different from 1, wherein n is a natural number.

4. The method according to claim 1, wherein at least one of the recoding and switching steps includes the step of using a remaining frame capacity for at least one of transmitting signaling information and transmitting additional data over a same transmission path within the communication network.

5. The method according to claim 4, wherein data from several different transmission channels are multiplexed in transmission frames of the communication network.

6. The method according to claim 1, wherein an analyzer of a transcoder device on a transmission path between the at least two stations detects whether data is present in at least one of the predefined frame format and a PCM signal, and wherein data is transmitted in a conventional transcoder mode when the analyzer detects the PCM signal.

7. The method according to claim 1, wherein, when discontinuous transmission occurs from one of the at least two transmitting stations, missing frames are inserted and marked in the predefined frame format.

8. The method according to claim 7, wherein when the discontinuous transmission occurs on the receiving side, frames inserted and marked are suppressed; and wherein when continuous transmission occurs on the receiving side and the coding rates are identical, a partial decoding takes place so that valid frames are generated in the predefined frame format.

* * * * *

UNITED STATES PATENT AND TRADEMARK OFFICE
CERTIFICATE OF CORRECTION

PATENT NO. : 6,067,289
DATED : May 23, 2000
INVENTOR(S) : Mueller et al.

Page 1 of 1

It is certified that error appears in the above-identified patent and that said Letters Patent is hereby corrected as shown below:

Column 1,
Line 12, change "...telephone●network..." -- telephone network --.
Line 25, delete "SUMMARY OF THE INVENTION".
Lines 42 and 43, insert -- SUMMARY OF THE INVENTION --.

Column 2,
Line 26, change "... $A_{bis}$ the ..." to -- $A_{bis}$ is the --.

Column 3,
Line 5, change "... the invention ..." to -- the present invention --.
Line 28, change "... the invention ..." to -- the present invention --.
Line 40, change "... the invention ..." to -- the present invention --.

Signed and Sealed this

Fifth Day of February, 2002

*Attest:*

JAMES E. ROGAN
*Attesting Officer*  *Director of the United States Patent and Trademark Office*